United States Patent
Udpa et al.

(10) Patent No.: US 11,137,359 B2
(45) Date of Patent: Oct. 5, 2021

(54) NONDESTRUCTIVE IMAGING USING A SPLIT-RING RESONATOR SENSING APPARATUS

(71) Applicant: Board of Trustees of Michigan State University, East Lansing, MI (US)

(72) Inventors: Lalita Udpa, Okemos, MI (US); Satish Udpa, Okemos, MI (US); Saptarshi Mukherjee, Milpitas, CA (US)

(73) Assignee: Board of Trustees of Michigan State University, East Lansing, MI (US)

( * ) Notice: Subject to any disclaimer, the term of this patent is extended or adjusted under 35 U.S.C. 154(b) by 85 days.

(21) Appl. No.: 16/801,439

(22) Filed: Feb. 26, 2020

(65) Prior Publication Data
US 2020/0278304 A1    Sep. 3, 2020

Related U.S. Application Data

(60) Provisional application No. 62/811,740, filed on Feb. 28, 2019.

(51) Int. Cl.
*G01N 22/02*    (2006.01)

(52) U.S. Cl.
CPC .................................. *G01N 22/02* (2013.01)

(58) Field of Classification Search
CPC ........ G01N 22/02; G01N 22/00; G01N 22/04; G01R 27/04; G01R 27/2688; G01B 15/02
See application file for complete search history.

(56) References Cited

U.S. PATENT DOCUMENTS

2012/0086463 A1    4/2012    Boybay et al.
2017/0292920 A1*  10/2017   Torun ................... H01Q 9/0407

OTHER PUBLICATIONS

Reference-Incorporating Microwave Resonator-Based Sensors for Biological Sensing Applications, Berk Camli et al., Proceedings 2017, 1, 542; doi:10.3390/proceedings1040542, pp. 1-4, published Aug. 7, 2017.
Design of a Split-Ring Resonator Sensor for Near-Field Microwave Imaging; Saptarshi Mukherjee et al., IEEE Sensors Journal, vol. 18, No. 17, pp. 7066-7076, Sep. 18, 2018.

* cited by examiner

*Primary Examiner* — Jermele M Hollington
*Assistant Examiner* — Suresh K Rajaputra
(74) *Attorney, Agent, or Firm* — Harness, Dickey & Pierce, PLC (57) ABSTRACT

A defect sensing apparatus is configured to identify defects or targets in materials. A further aspect of the defect sensing apparatus includes a reference split-ring resonator coupled to the microstrip. The defect sensing apparatus includes a reference split-ring resonator located on a reference side of the microstrip and a first sensing split-ring resonator located on a sensing side of the microstrip.

20 Claims, 7 Drawing Sheets

NONDESTRUCTIVE IMAGING USING A SPLIT-RING RESONATOR SENSING APPARATUS

CROSS REFERENCE

This application claims the benefit of U.S. Provisional Application 62/811,740, filed Feb. 28, 2019. The entire disclosure of the above application is incorporated herein by reference.

FIELD

The present disclosure relates to nondestructive evaluation of materials and more particularly to detecting defects within the materials using split-ring resonators.

BACKGROUND

With the recent advances in sensors, numerical modeling, image processing, and material science, a diverse range of diagnostic and prognostic techniques are being developed for assessing structural integrity and reliability. Split-ring resonators (SRRs) have been used in the design of metamaterials, largely due to their frequency selective behavior. Specifically, SRRs behave as sub-wavelength resonators when excited by a time-varying magnetic field perpendicular to the plane of the SRRs. Thus, SRRs are able to inhibit signal propagation in a narrow band, close to their resonant frequency. SRRs can be modeled as LC resonant tanks, with a resonant frequency dependent on the SRR unit cell parameters, such as ring size, width, and edge gaps. When excited by a microstrip transmission line, SRRs have demonstrated great potential for bio-sensing applications. The dielectric coupling due to the presence of biomolecules lead to a shift of resonance frequency, which can be utilized for bio-sensing.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In accordance with the present invention, a defect sensing apparatus is configured to identify defects or targets in materials. The defect sensing apparatus includes a microstrip transmission line along a length of the defect sensing apparatus and a reference split-ring resonator coupled to the microstrip transmission line. The reference split-ring resonator is located on a reference side of the microstrip transmission line. The defect sensing apparatus includes a first sensing split-ring resonator coupled to the microstrip transmission line. The first sensing split-ring resonator is located on a sensing side of the microstrip transmission line. The defect sensing apparatus includes a second sensing split-ring resonator coupled to the microstrip transmission line. The second sensing split-ring resonator is located on the sensing side of the microstrip transmission line. The microstrip transmission line is configured to excite the reference split-ring resonator, the first sensing split-ring resonator, and the second sensing split-ring resonator. The first sensing split-ring resonator and the second sensing split-ring resonator are configured to scan a sample.

In other features, the sensing side of the microstrip transmission line is opposite from the reference side of the microstrip transmission line. In other features, the reference split-ring resonator, the first sensing split-ring resonator, and the second sensing split-ring resonator include an inner ring and an outer ring. In other features, the outer ring of the first sensing split-ring resonator and the second sensing split-ring resonator includes an extended tip. In other features, the extended tip is extended in a direction opposite from the microstrip transmission line.

In other features, the inner ring includes a first gap directed toward the microstrip transmission line, and the outer ring includes a second gap directed opposite the first gap. In other features, the defect sensing apparatus includes a third sensing split-ring resonator coupled to the microstrip transmission line and located on the sensing side of the microstrip transmission line. In other features, the first sensing split-ring resonator resonates at a first frequency and the second sensing split-ring resonator resonates at a second frequency, where the first frequency is different from the second frequency.

In other features, the defect sensing apparatus includes at least one processor and a memory in data communication with the defect sensing apparatus. The memory stores instructions for execution by the at least one processor and the instructions include measuring a first frequency of the first sensing split-ring resonator and storing the first frequency as a first resonant frequency. The instructions include, for a predetermined period, measuring a subsequent first frequency of the first sensing split-ring resonator and, in response to the subsequent first frequency shifting by a predetermined threshold from the first resonant frequency within the predetermined period, generating an alert.

In other features, the instructions include measuring a second frequency of the second sensing split-ring resonator and storing the second frequency as a second resonant frequency. The instructions include, for the predetermined period, measuring a subsequent frequency of the second sensing split-ring resonator and, in response to the subsequent second first frequency shifting by the predetermined threshold from the second resonant frequency within the predetermined period, generating the alert.

In other features, the instructions include measuring a reference frequency of the reference split-ring resonator and storing the reference frequency. The instructions include, in response to the first frequency shifting by the predetermined threshold from the reference frequency within the predetermined period, generating the alert.

A defect sensing system includes a first sensing split-ring resonator, a second sensing split-ring resonator, and a reference sensing split-ring resonator mounted on a board. The board includes a microstrip transmission line separating the reference sensing split-ring resonator. The defect sensing system includes at least one processor and a memory. The memory stores a measured frequency database and instructions for execution by the at least one processor. The instructions include measuring (i) a first frequency of the first sensing split-ring resonator and (ii) a second frequency of the second sensing split-ring resonator. The instructions include storing, in the measured frequency database, the first frequency and the second frequency and repeating measuring (i) the first frequency and (ii) the second frequency. The instructions include comparing the measured first frequency to the stored first frequency and comparing the measured second frequency to the stored second frequency. The instructions include, in response to the comparison indicating a first frequency shift or a second frequency shift by a predetermined threshold, generating and transmitting an alert.

In other features, the defect sensing system includes a display interface. In other features, the instructions include repeating the measuring for a predetermined period, plotting the measured first frequency and the measured second frequency on a frequency graph, and displaying the frequency graph on the display interface. In other features, the instructions include measuring a reference frequency of the reference sensing split-ring resonator. The measured first frequency is compared to the measured reference frequency and, in response to the comparison indicating the first frequency shift by a first reference predetermined threshold, generating a reference alert.

In other features, the instructions include measuring a reference frequency of the reference sensing split-ring resonator. The measured second frequency is compared to the measured reference frequency and, in response to the comparison indicating the second frequency shift by a second reference predetermined threshold, generating a reference alert. In other features, the reference sensing split-ring resonator, the first sensing split-ring resonator, and the second sensing split-ring resonator include an inner ring and an outer ring. In other features, the outer ring of the first sensing split-ring resonator and the second sensing split-ring resonator includes an extended tip. In other features, the extended tip is extended in a direction opposite from the microstrip transmission line. In other features, the inner ring includes a first gap directed toward the microstrip transmission line, and the outer ring includes a second gap directed opposite the first gap.

A defect sensing apparatus includes a microstrip transmission line along a length of the defect sensing apparatus. The microstrip transmission line includes a first port and a second port. The second port is located on an opposite end from the first port. The defect sensing apparatus includes a reference split-ring resonator coupled to the microstrip transmission line, a first sensing split-ring resonator coupled to the microstrip transmission line, and a second sensing split-ring resonator coupled to the microstrip transmission line. The microstrip transmission line is configured to excite the reference split-ring resonator, the first sensing split-ring resonator, and the second sensing split-ring resonator. The defect sensing apparatus includes at least one processor and a memory in data communication with the microstrip transmission line, via the first port and the second port, and the at least one processor. The memory stores instructions for execution by the at least one processor and the instructions include measuring (i) a first frequency of the first sensing split-ring resonator and (ii) a second frequency of the first sensing split-ring resonator. The instructions include storing the first frequency and the second frequency and repeating measuring (i) the first frequency and (ii) the second frequency. The instructions include comparing the measured first frequency to the stored first frequency and comparing the measured second frequency to the stored second frequency. The instructions include, in response to the comparison indicating a first frequency shift or a second frequency shift, generating and transmitting an alert.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

DETAILED DESCRIPTION

A split-ring resonator (SRR) sensor design for microwave nondestructive evaluation (NDE) applications is used for interrogating composites through edge coupling. The use of band-stop design allows multiple SRR cells of varying sizes to be integrated in an array format in the SRR sensor design. Each SRR cell resonates at a different resonant frequency, providing dynamic tuning capabilities such as a high quality factor, greater penetration depth at low frequencies, and high resolution at higher frequencies. Moreover, a reference SRR is also integrated on the SRR sensor design for calibration of the sensing SRR sensors and for providing better signal-to-noise ratio. Additional details regarding the present disclosure are described in Design of a Split-Ring Resonator Sensor for Near-Field Microwave Imaging, IEEE Sensors Journal, Vol. 18, No. 17, Sep. 1, 2018, which is incorporated by reference.

The simplistic design of the SRR sensor design eliminates the need for complex matching circuits, making the SRR sensor design compact. Simulation results demonstrate the feasibility of the SRR sensor design for detection of small targets and defects in composites. Parametric analysis using a simulation model aid in determining the limits of the SRR sensor design. The performance of the fabricated sensor demonstrates its efficiency in material sensing applications. Furthermore, the integration of the SRR sensor design in an experimental NDE system for detection of defects in additive manufactured metals and composites validates its use in practical NDE applications.

Additionally, SRRs behave as sub-wavelength LC resonant tanks when excited by a time-varying magnetic field perpendicular to a plane of the SRRs. When excited by a microstrip transmission line, SRRs are able to inhibit signal propagation in a narrow band close to their resonant frequency. In close proximity of a sample, fringing fields between a gap of an SRR interact with the sample and shift the resonant frequency of the SRR, which can be monitored and compared to a reference resonant frequency to identify anomalies in the sample.

In particular, in the design of the present disclosure, composite samples can be imaged through edge coupling and compared to a reference resonant frequency of a reference SRR configured on an opposite side of the microstrip transmission line. The location of the reference SRR prevents interference of the composite sample on the reference resonant frequency of the reference SRR, allowing for a comparison of shifted resonant frequencies of sensing SRRs to determine if a target or a defect in the composite sample is present. Moreover, using SRR interrogation methods of composite samples is a nondestructive method of evaluating (nondestructive evaluation or NDE) and retrieving information about the quality of composite samples. SRR evaluation methods further provide a method of detecting sub-wavelength defects in composite samples and additive manufactured metals.

Existing methods involve the use of SRR sensor designs for strain sensing, bio-sensing, and material characterization applications. To tailor the SRR sensor designs for imaging and NDE applications, the SRR sensor design may be modified from its basic structure and optimized, as described below.

Figure 1:
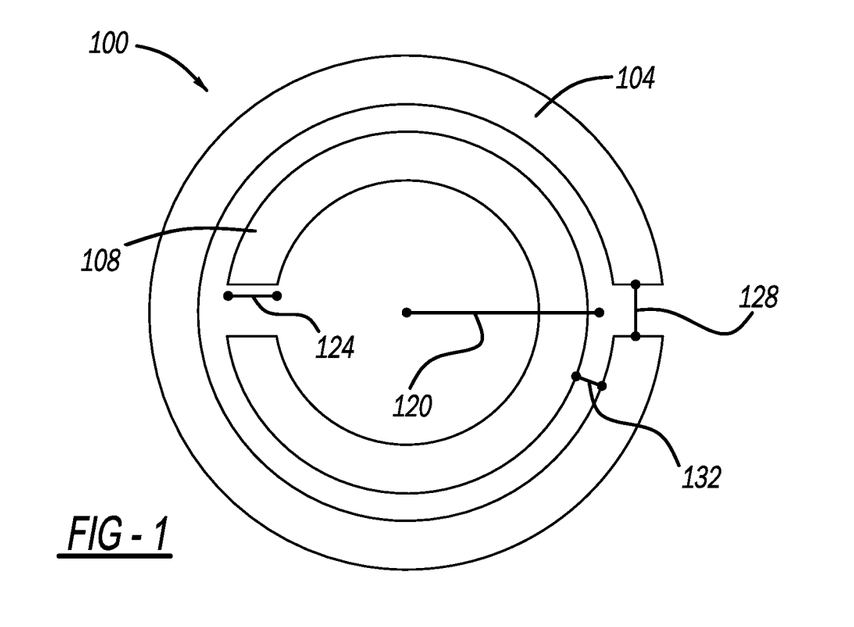
FIG. 1 is a diagrammatic view showing an exemplary design of a split-ring resonator (SRR) unit cell.

Referring to FIG. 1, an exemplary design of a split-ring resonator (SRR) unit cell 100 is depicted. The SRR unit cell 100 includes an outer ring 104 and an inner ring 108. The inner ring 108 is oriented in an opposite direction to the outer ring 104. The SRR unit cell 100 behaves as a simple LC resonance circuit, with the resonant frequency $f_0$ given by Equation 1:

$$f_0 = \frac{1}{2\pi\sqrt{LC}}$$

where L and C are the effective inductance and capacitance of the SRR unit cell 100. The inductance is primarily due to inductance of the individual rings and the coupling between the outer ring 104 and the inner ring 108. The capacitance is primarily due to the split gap, for example, g, of each ring and the mutual capacitance between the outer ring 104 and the inner ring 108.

The split in the outer ring 104 mainly contributes to the capacitance contribution in Equation 1. The split in the outer ring 104 is also responsible for the negative permeability of the structure and aids in lowering the resonant frequency $f_0$ by eliminating the half-wavelength requirement for resonance. The inner ring 108 lowers the resonant frequency further by generating a large capacitance across the gaps between the outer ring 104 and the inner ring 108. A time varying magnetic field applied parallel to the axis of the SRR unit cell 100, for example, via a microstrip line with two connecting ports, induces surface currents on the SRR unit cell 100 at the respective resonant frequency, producing a dipolar magnetic field. Therefore, SRRs behave as narrow band suppression, high quality (Q) resonators.

Figure 2:
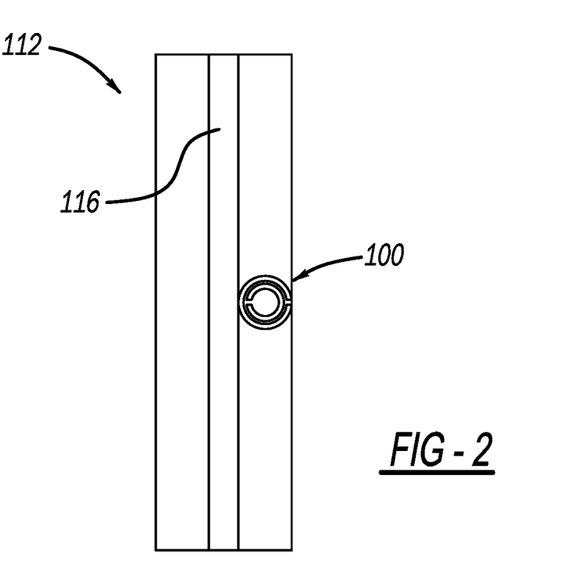
FIG. 2 is a diagrammatic view showing an exemplary implementation of an SRR sensor design of a microstrip line coupled SRR sensor using the SRR unit cell of FIG. 1.

In FIG. 2, an exemplary implementation of an SRR sensor 112 design of a microstrip line 116 coupled SRR sensor using the SRR unit cell 100 of FIG. 1 is shown. In an exemplary embodiment, the SRR sensor 112 is implemented on a substrate of $\epsilon_r$=10.2 with a thickness of 1.27 mm, where the microstrip line 116 has a width of 1.2 mm. The simulated scattering parameters show resonance at 9.5 GHz frequency with a Q factor of 35. The resonant frequency shifts when the SRR sensor 112 is brought in close proximity to a sample due to the dielectric loading. Based on the perturbation theory for a cavity resonator, the resonant frequency shift ($\Delta f$) due to the presence of a material of volume V may be expressed in Equation 2, below:

$$\frac{f_0}{\Delta f} \approx \frac{\iiint_V (\Delta\mu |H_0|^2 + \Delta\varepsilon |E_0|^2) dv}{\iiint_V (\mu |H_0|^2 + \varepsilon |E_0|^2) dv}$$

where $E_0$ and $H_0$ are the electric and magnetic fields, respectively, $\epsilon$ and $\mu$ are the original permittivity and permeability, respectively, and $\Delta\epsilon$ and $\Delta\mu$ are the change of material properties, respectively.

The resonant frequency shift ($\Delta f$) calculated in Equation 2 indicates the presence of a sample in the vicinity of the SRR sensor 112 as well as changes in material properties of the sample, for example, due to defects. Moreover, SRRs resonate at much higher wavelengths than the physical dimensions of the SRR (~$\lambda$/16), where $\lambda$ is the wavelength of operation, providing sub-wavelength detection of targets. A major advantage is the fact that the SRRs are excited inductively by a magnetic field, allowing integration of multiple SRR unit cells on the same structure.

Parameters of the SRR unit cell 100, generally described above, that are used in the SRR sensor 112 can affect the performance of the SRR sensor 112, such as an average ring radius 120, $r_0$, of the outer ring 104 and the inner ring 108, a thickness 124, t, of the outer ring 104 and the inner ring 108, a split gap 128, g, of the outer ring 104 and the inner ring 108, and a distance 132, d, between the outer ring 104 and the inner ring 108. These parameters of the SRR unit cell 100 can be adjusted to optimize the SRR sensor 112.

In an exemplary optimization, the average ring radius 120, $r_0$, is parametrically varied from 0.6 to 0.9 mm. Increasing the average ring radius 120 leads to an increase in the SRR inductance as well as SRR capacitance due to increased metal surface area. Such increases lead to lowering of the resonant frequency. The resistance of the SRR sensor 112 is responsible for power dissipation and thus determines a corresponding Q factor. The Q factor can be expressed as $Q^{-1} = \delta/r_0$, where $\delta$ is the skin depth. Therefore, an increase in the average ring radius 120 leads to an increase of the Q factor. Another parameter that affects the Q factor is the thickness of the substrate on which the SRR sensor 112 is implemented. As the thickness of the substrate increases, the trace width also increases in order to maintain the effective impedance of the microstrip line 116 as 50Ω, increasing the Q factor of the SRR sensor 112.

A further exemplary optimization may be conducted for the thickness 124, t, of the outer ring 104 and the inner ring 108. The thickness 124 is varied from 0.1 to 0.5 mm. Increasing the thickness 124 leads to an increase in the SRR inductance due to an increase in surface currents as well as SRR capacitance due to an increase in surface area. Further, the result of increasing the thickness 124 leads to a decrease in resonant frequency.

Additionally, the split gap 128, g, of the outer ring 104 and the inner ring 108 can be varied from 0.05 to 0.4 mm. Increasing the split gap 128 leads to a decrease in the SRR inductance due to decrease in surface area of the SRR. Increasing the split gap also leads to a decrease in the ring capacitance due to an increase in the separation between the ends of the outer ring 104 and the inner ring 108. Further, the result of increasing the split gap 128 leads to an increase in resonant frequency.

For another exemplary optimization, the distance 132, d, between the outer ring 104 and the inner ring 108 is varied from 0.05 to 0.4 mm. The inner ring 108, which is oriented in an opposite direction to the outer ring 104 is responsible for concentrating the fields, thereby generating a large capacitance across the distance 132 between the outer ring 104 and the inner ring 108. An increase in the distance 132 has a counterbalancing effect due to a decrease in the mutual capacitance and inner ring 108 inductance as well as increase in outer ring 104 inductance. If the distance 132 is too small, the effect of the capacitance of inner ring 108 is more pronounced, leading to an increase in resonant frequency. However, if the distance 132 is too large, the effect of increase in outer ring 104 inductance is more pronounced and leads to a decrease in resonant frequency.

Figures 3, 4A, 4B:
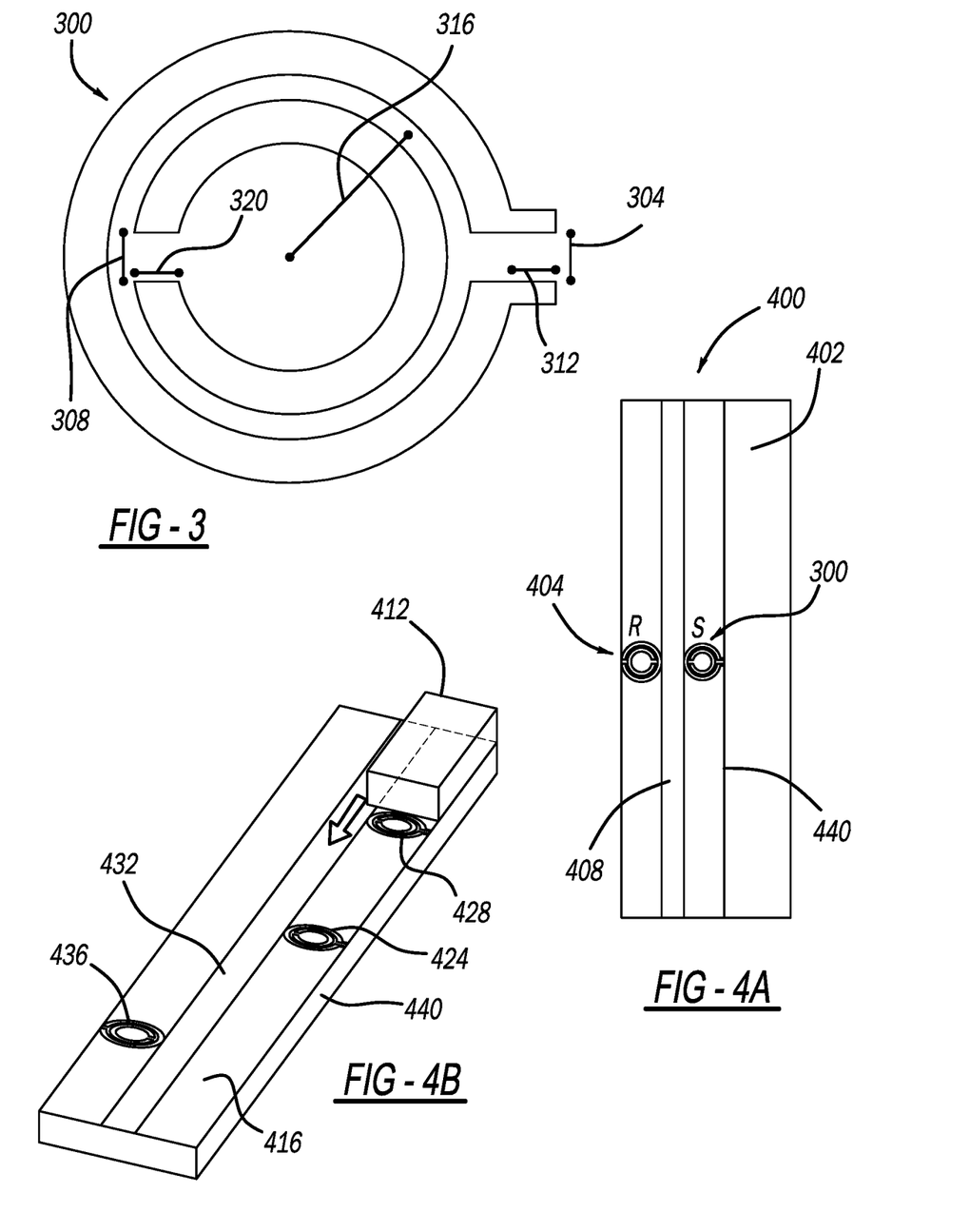
FIG. 3 is a diagrammatic view showing an exemplary design of an extended tip SRR unit cell.
FIG. 4A is a diagrammatic view showing an exemplary implementation of a microstrip line coupled extended tip SRR unit cell of FIG. 3 operating as an exemplary SRR sensor design.
FIG. 4B is a diagrammatic view showing an exemplary implementation of an extended tip SRR sensor array design scanning a sample.

Referring now to FIG. 3, an exemplary design of an extended tip SRR unit cell 300 is shown. The design of the extended tip SRR unit cell 300 improves resolution and enables better scanning accuracy. The fringing fields at the SRR gap can detect local changes of permittivity due to the large capacitance of the SRR. In an exemplary implementation, the extended tip SRR unit cell 300 has a gap width 304 and 308 of 0.2 mm, a gap length 312 of 0.2 mm, an average ring radius 316 of 0.76 mm, and a ring thickness 320 of 0.2 mm.

FIG. 4A is an exemplary implementation of a microstrip line coupled extended tip SRR unit cell 300 of FIG. 3 operating as an exemplary SRR sensor design 400. The exemplary SRR sensor design 400 includes the extended tip SRR unit cell 300 (S) operating to sense a target or a defect of a sample 402 when the sample 402 is swept along the exemplary SRR sensor design 400 or vice versa. In various implementations, the sample 402 may be a composite. The exemplary SRR sensor design 400 also includes a reference SRR unit cell 404 (R) on an opposite side of a microstrip line 408.

The extended tip SRR unit cell 300 is placed near a sensing edge of the exemplary SRR sensor design 400 and the sample 402 may be scanned from the sensing edge of the exemplary SRR sensor design 400 instead of the top for efficient scanning, improved detection, and improved resolution. While the extended tip SRR unit cell 300 is placed on a sensing or scanning edge 440 of the exemplary SRR sensor design 400, the reference SRR unit cell 404 is placed on the other side of the microstrip line 408. In various implementations, the reference SRR unit cell 404 is equivalent to the SRR unit cell 100 of FIG. 1.

During the scanning process, the reference SRR unit cell 404 does not interact with the sample 402 and the reference resonant frequency of the reference SRR unit cell 404 does not change as it is not loaded, while the resonant frequency for the extended tip SRR unit cell 300 changes due to close proximity of the sample 402. Thus, the resonant frequency shift of the extended tip SRR unit cell 300 with respect to the reference resonant frequency can be calculated in real time to determine if the resonant frequency shift indicates the presence of a target or defect within the sample 402. For example, in various implementations, if the resonant frequency shift exceeds a predetermined threshold, then the presence of a target or defect is indicated. Therefore, the design of the exemplary SRR sensor design 400 eliminates the need for calibration or a reference signal, improving the sensing abilities of the exemplary SRR sensor design 400.

Referring now to FIG. 4B, an exemplary implementation of an extended tip SRR sensor array design 410 scanning a sample 412 is shown. The sample 412 (for example, a composite) is placed parallel to a ring surface 416 of the exemplary extended tip SRR sensor array design 410. For example, a first SRR unit 424 and a second SRR unit 428 of the extended tip SRR sensor array design 410 may be extended tip SRRs, such as the extended tip SRR unit cell 300 of FIG. 3. In various implementations, the second SRR unit 428 may have varying dimensions for the first SRR unit 424 by having a smaller split gap, such as 0.1 mm, or larger to vary resolution and sensitivity of the extended tip SRR sensor array design 410. The extended tip SRR sensor array design 410 also includes a microstrip 432 and a reference SRR unit 436. In the configuration depicted in FIG. 4B, the resolution of imaging is limited to the dimensions of the incorporated SRR unit cells ($\sim\lambda/16$). To produce improved imaging resolution, FIG. 4C depicts another sensing configuration.

Figures 4C, 5:
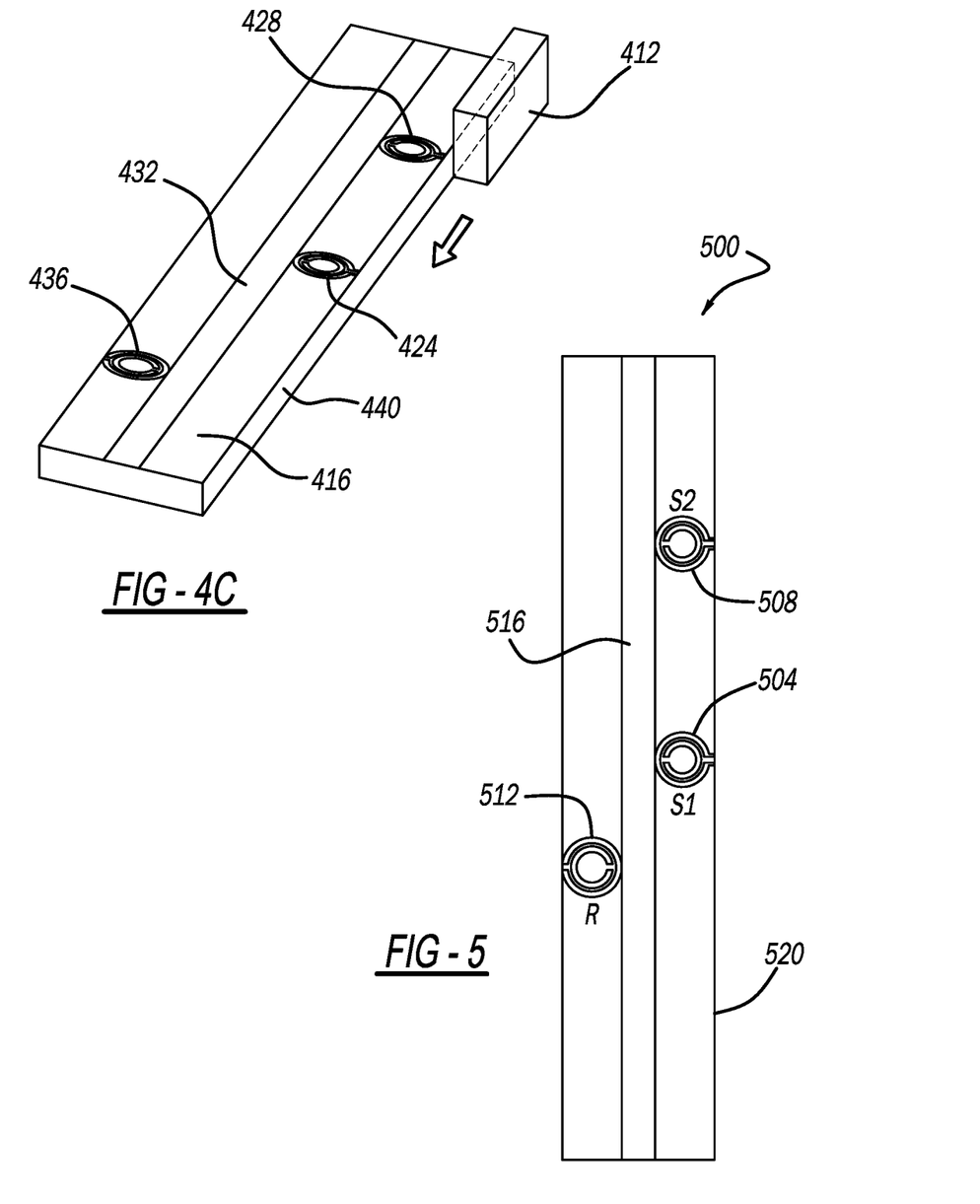
FIG. 4C is a diagrammatic view showing another exemplary implementation of the extended tip SRR sensor array design scanning the sample.
FIG. 5 is a diagrammatic view showing an exemplary design of a sensing SRR array including two sensing SRRs.

Another exemplary implementation of the extended tip SRR sensor array design 410 scanning the sample 412 is shown in FIG. 4C. The sample 412 is placed perpendicular to the ring surface 416 of the exemplary extended tip SRR sensor array design 410. In FIG. 4C, the fringing fields, due to the split capacitance of the outer ring, is primarily responsible for interrogation and inspection of the sample 412. Therefore, the resolution is dependent on the split gap ($\sim\lambda/100$), and is highly enhanced compared to the configuration depicted in FIG. 4B. As shown in FIGS. 3 and 4A, the extended tip of the sensing rings are extended outwards to guide the fringing fields and increase sensitivity along the sensing or scanning edge 440. The increased inductance and capacitance due to the additional metal and increase in plate area leads to a decrease in resonant frequency of the first SRR unit 424 relative to the resonant frequency of the reference SRR unit 436.

Based on the resonant frequency shifts, without the extended tip, an SRR sensor configuration is capable of detecting a target or defect in the sample 412 in the configuration of FIG. 4B, while it is unable to detect the defect in the sample 412 in the configuration of FIG. 4C. However, using the extended tip SRR unit cell 300 of FIG. 3, both configurations in FIGS. 4B and 4C can detect the defect in the sample 412. Additionally, the extended tip SRR unit cell 300 of FIG. 3 has improved detection and higher resolution in the configuration of FIG. 4C than the conventional SRR unit cell 100 of FIG. 1, while keeping the fringing field distribution unhampered. Further modifications such as tapering of the extended tip closer to each other would increase the resolution, but would lead to a faster decay of the fringing fields, thus providing lower penetration. Moreover, scanning large sample areas is easier in the configuration of FIG. 4C than the configuration of FIG. 4B, since the lift-off distance is minimal and the sample size is independent of the SRR sensor. The fields from the extended tip SRR sensor are also higher than that of a conventional SRR sensor.

FIG. 5 is an exemplary design of a sensing SRR array 500 including two sensing SRRs. The sensing SRR array 500 includes a first SRR 504 (S1) and a second SRR 508 (S2) as well as a reference SRR 512 (R). The reference SRR 512 is included on one side of a microstrip 516 while the first SRR 504 and the second SRR 508 are on another side of the microstrip 516. The reference SRR 512 remains a distance from a sensing side 520 of the sensing SRR array 500 to remain unaffected by any target or defect included in a sample interrogated by the sensing SRR array 500. The reference SRR 512 maintains a reference resonant frequency when a sample is interrogated due to the distance provided between the reference SRR 512 and the sensing side 520. Therefore, the reference resonant frequency can be compared to a first resonant frequency of the first SRR 504 and a second resonant frequency of the second SRR 508. The first resonant frequency and/or the second resonant frequency may shift in the presence of a sample including a target or a defect. Both of the first resonant frequency and the second resonant frequency are continuously compared to the reference resonant frequency to identify when a shift has occurred to identify the target or defect in the interrogated sample.

The band-stop structure of the sensing SRR array 500 allows integration of multiple SRR cells on the microstrip line, each resonating at different frequencies. Therefore, the first SRR 504 and the second SRR 508 are placed on the same side of the microstrip line with different gap widths of 0.2 and 0.1 mm, along with the reference SRR 512 on the other side of the line. In various implementations, all of the SRRs are separated by a distance of 8 mm (~$\lambda$/4) from each other to avoid coupling between them. The gap width of the second SRR 508 is smaller than that of the first SRR 504. A smaller gap width of the second SRR 508 results in a capacitance increase, thus leading to a lower resonant frequency.

Figure 6:
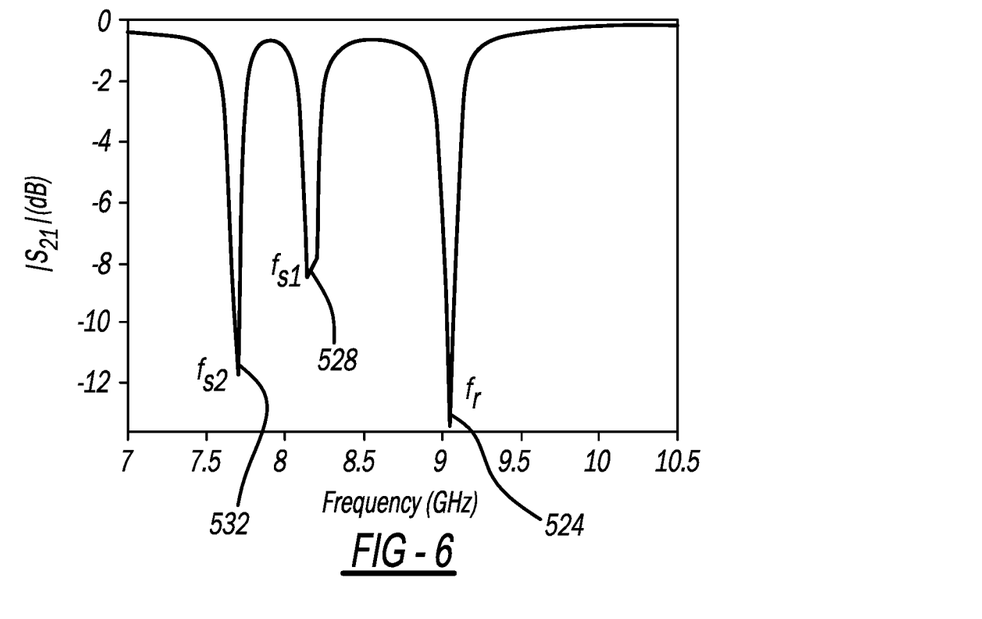
FIG. 6 is a graphical depiction showing resonant frequencies of the sensing SRR array of FIG. 5 obtained from insertion loss magnitude.

As shown in the graph of FIG. 6 depicting resonant frequencies of the sensing SRR array 500 obtained from insertion loss magnitude, the reference resonant frequency 524 of the reference SRR 512 is approximately 9 GHz, the first resonant frequency 528 of the first SRR 504 is approximately 8.1 GHz, and the second resonant frequency 532 of the second SRR 508 is approximately 7.6 GHz. Hence, the second resonant frequency 532 has a lower resonant frequency than that of the first resonant frequency 528.

Figure 7:
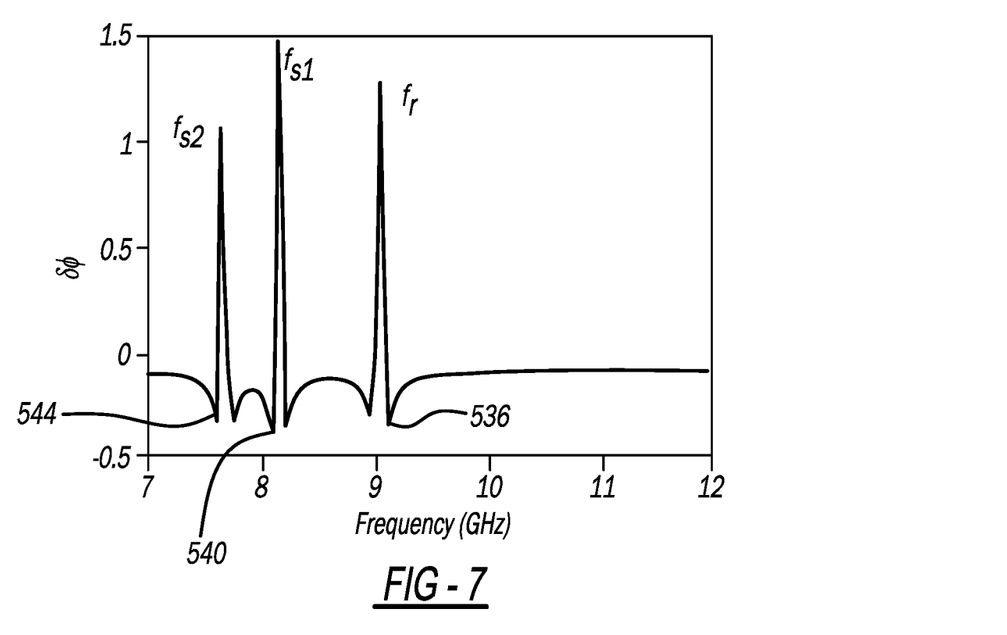
FIG. 7 is a graphical depiction showing resonant frequencies of the sensing SRR array of FIG. 5 obtained from insertion loss phase difference.

FIG. 7 is a graphical depiction of resonant frequencies of the sensing SRR array 500 obtained from insertion loss phase difference. As shown in FIG. 7, the exact measure of the resonant frequency can be extracted from the local minima of the unwrapped phase. For example, as shown in FIG. 7, a local minima of the reference resonant frequency 536 of the reference SRR 512 is approximately 9 GHz, a local minima of the first resonant frequency 540 of the first SRR 504 is approximately 8.1 GHz, and a local minima of the second resonant frequency 544 of the second SRR 508 is approximately 7.6 GHz. From simulation studies and parametric analysis, both magnitude and phase information are sensitive to sample properties and thus can both serve as candidates for determining a resonance shift.

Figures 8A, 8B:
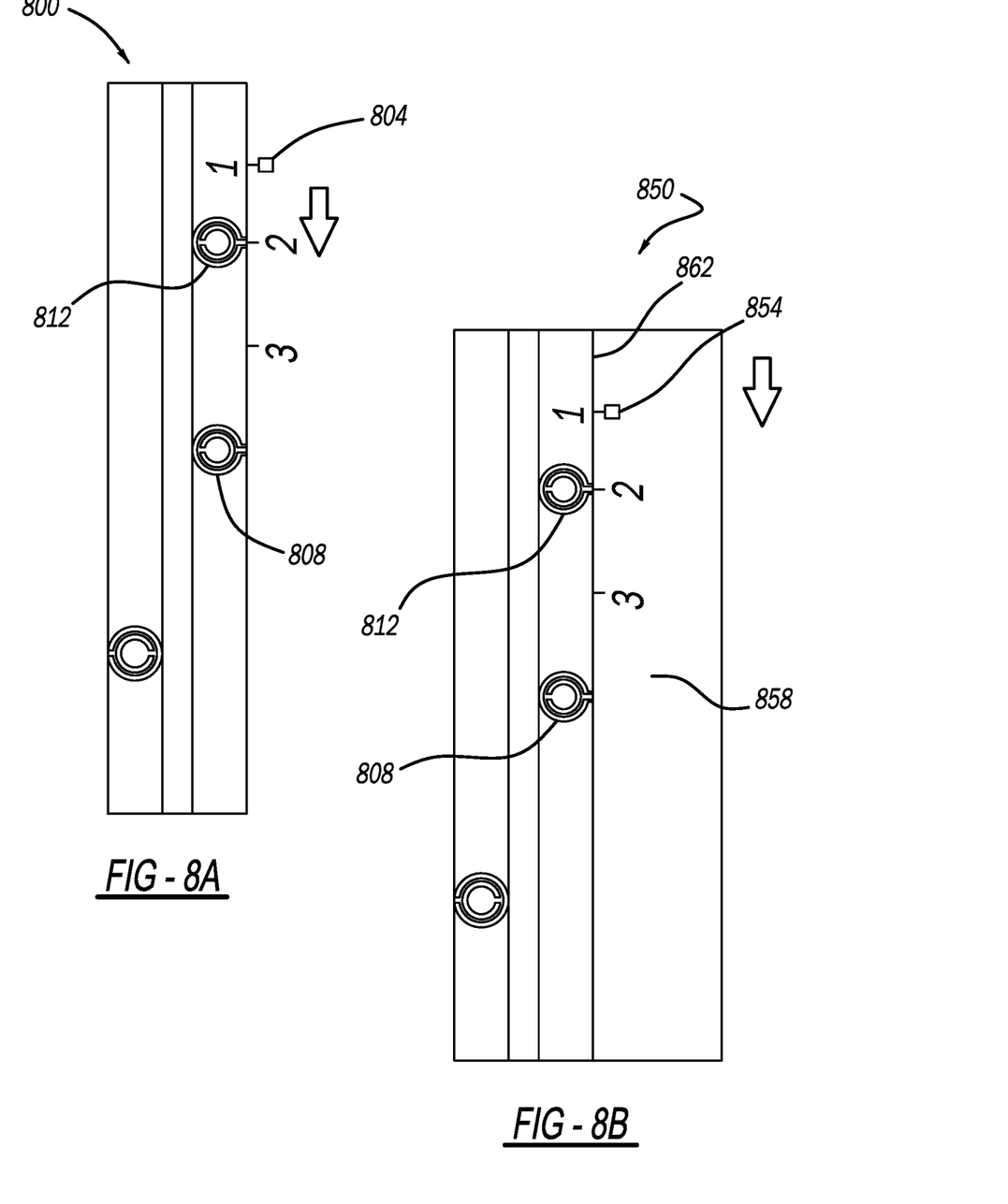
FIG. 8A is a diagrammatic view showing an exemplary design of an SRR system detecting a target.
FIG. 8B is a diagrammatic view showing an exemplary design of an SRR system detecting a defect.

FIG. 8A is an exemplary design of a SRR system 800 detecting a target 804. The target 804 is moved along the edge of the SRR system 800. For example, the target 804 is a dielectric square sample block with dimensions 0.4×0.4× 0.4 mm$^3$ and $\epsilon_r$=3. For positions 1 and 3, the resonant frequency for a first SRR 808 and a second SRR 812 is unchanged, since both positions correspond to no change in the dielectric properties. However, the resonant frequency of the second SRR 812 shifts to the left at position 2 when the fringing fields of the second SRR 812 interact with the target 804, in compliance with Equation 2. The phase change at the resonant frequencies is tracked along with the scan and plotted, for example, in real time. In the vicinity of the target 804, the phase at the resonant frequency of the first SRR 808 and the second SRR 812 changes by 15 degrees, while remaining constant at all other frequencies. The full width at half maxima of the phase change in a real time plot can provide an estimate of the actual size of the target. In various implementations, the SRR system 800 can store plotted resonant frequencies for subsequent plotting and analysis.

Now referring to FIG. 8B, an exemplary design of a SRR system 850 detecting a defect 854 is shown. For example, a Glass Fiber Reinforced Plastic (GFRP) composite sample 858, placed in close proximity of the SRR system 850, is moved along an edge 862. The GFRP composite sample 858 has a small air void or the defect 854 of 0.5 mm diameter, placed 0.5 mm away from the edge 862 of the GFRP composite sample 858. Similar to FIG. 8A, in positions 1 and 3, the resonant frequency for all SRRs remains unchanged, since both positions correspond to no change in the dielectric properties. However, for position 2, the resonant frequency of the second SRR 812 shifts to the right. The loss of dielectric material in the defect 854 is responsible for shifting the resonance to the right. The phase change at the resonant frequencies is tracked with respect to the scan and plotted. In the vicinity of the defect 854, the phase at the resonant frequency of the first SRR 808 and the second SRR 812 changes by 6 degrees, while remaining constant at all other frequencies. The full width at half maxima (1 mm) of the phase change can provide an estimate of the actual size of the defect.

Figure 9:
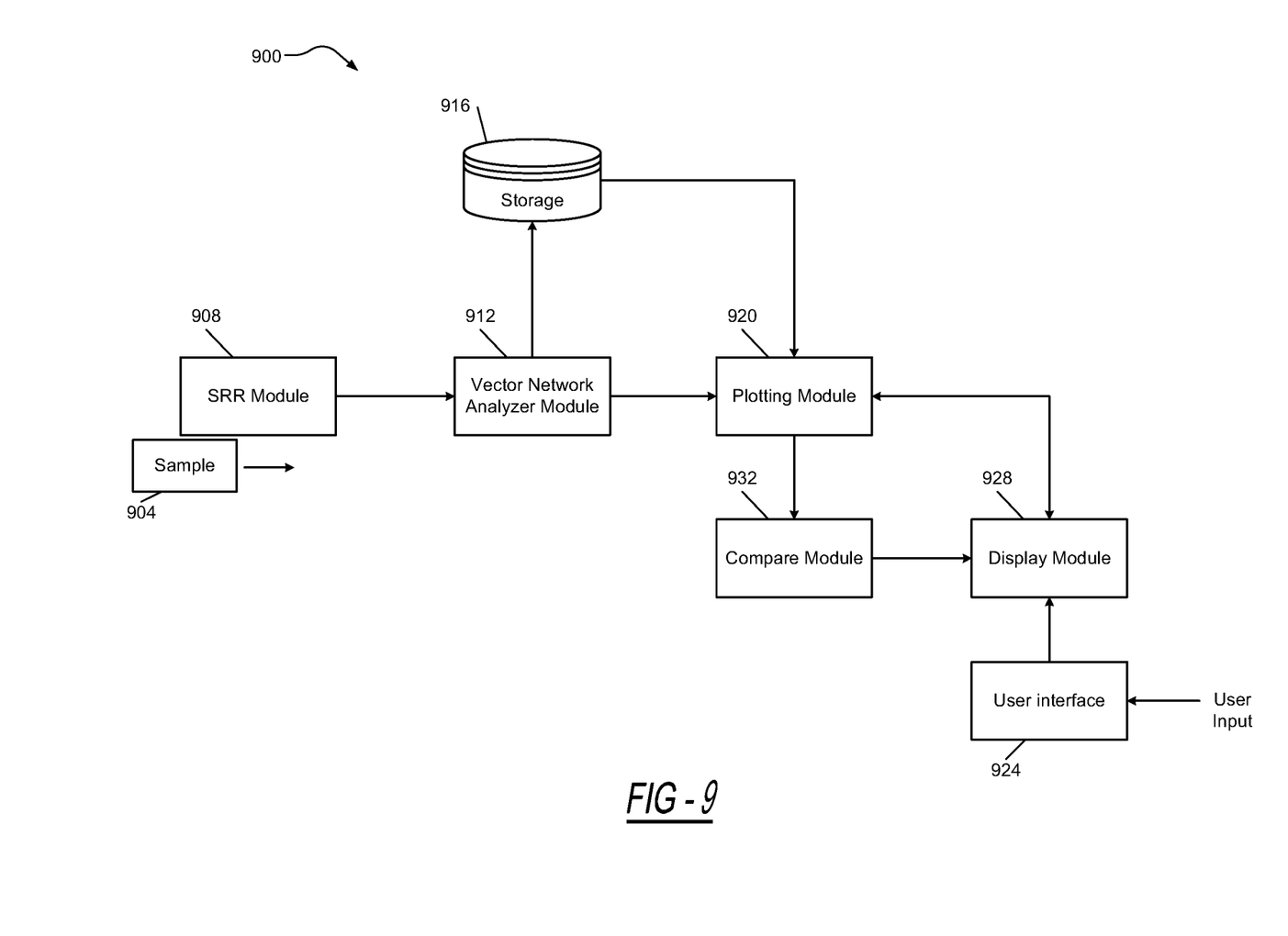
FIG. 9 is an exemplary functional block diagram depicting an SRR scanning system.

FIG. 9 is an exemplary functional block diagram depicting an SRR scanning system 900 scanning a sample 904 with an SRR module 908 and processing the scanned sample 904. In various implementations, the sample 904 may be scanned for the purpose of NDE. Therefore, the sample 904 may be a structure, such as a building, a bridge, etc. As shown in FIG. 8B, the sample 904 could include a defect for detection. The sample 904 is moved along the SRR module 908. In various implementations, the SRR scanning system 900 is an individual unit and is moved along the sample 904. The SRR module 908 is connected to a vector network analyzer module 912 configured to measure resonant frequencies of each SRR ring included in the SRR module 908. For example, the SRR module 908 may be designed as the sensing SRR array 500 of FIG. 5, including two sensing SRRs and a reference SRR. The SRR module 908 may also include the microstrip line including ports on either end for a wired connection to the vector network analyzer module 912.

The vector network analyzer module 912 monitors the resonant frequencies of the two sensing SRRs and the reference SRR. The vector network analyzer module 912 stores each measured resonant frequencies at each time point in a storage 916. Additionally, in real time analyses, a plotting module 920 receives the measured resonant frequencies from the vector network analyzer module 912 and plots the resonant frequencies from each time point for each SRR. In various implementations, the plotting module 920 may obtain measured resonant frequencies from the storage 916 in response to user input received via a user interface 924 through a display module 928. For example, the SRR scanning system 900 may display data on the user interface 924 configured by the display module 928 according to a user request.

In various implementations, the display module 928 is configured to receive plotted resonant frequencies from the plotting module 920 and display the plotted resonant frequencies on the user interface 924. The SRR scanning system 900 may also include a compare module 932 configured to analyze the resonant frequencies plotted by the plotting module 920 and determine if any of the resonant frequencies shifts by a predetermined threshold. For example, when the resonant frequencies of one of the two sensing SRRs shifts at all or by the predetermined amount, a defect or target may be indicated as detected. The compare module 932 is configured to identify any shifts in resonant frequencies and transmit any detected shifts to the display module 928.

For example, if a shift occurs that exceeds the predetermined threshold, the display module 928 is configured to display a warning or alert to the user interface 924 that a target or defect was detected. Further, as described above, based on the shift, the compare module 932 may also transmit to the user interface 924 via the display module 928 a location of the detected target or defect. In various implementations, the SRR scanning system 900 may output a visual indication (via the user interface 924), an audio indication, or a haptic indication, in real time, that the target or defect has been detected. Additionally, the display module 928 may be configured to display the heat-maps described in FIGS. 11 and 12, below, on the user interface 924 after appropriate analysis by the vector network analyzer module 912, plotting by the plotting module 920, and comparing by the compare module 932.

As mentioned above, the SRR scanning system 900 may be an individual unit including the SRR module 908, the vector network analyzer module 912, the storage 916, the plotting module 920, the compare module 932, the display module 928, and the user interface 924. The SRR scanning system 900 may be a handheld, portable device where the user interface 924 is configured to receive user input via, for example, a touchscreen for toggling between types of output information. The user interface 924 is also configured to display or output results from the plotting module 920 and the compare module 932 indicating to the user if a defect exists or if a target is identified in the sample 904. In various implementations, the storage 916 may store processor executable instructions that cause a processor (not shown) of the SRR scanning system 900 to instruct the operation of the vector network analyzer module 912, the plotting module 920, the compare module 932, and/or the display module 928.

Figure 10:
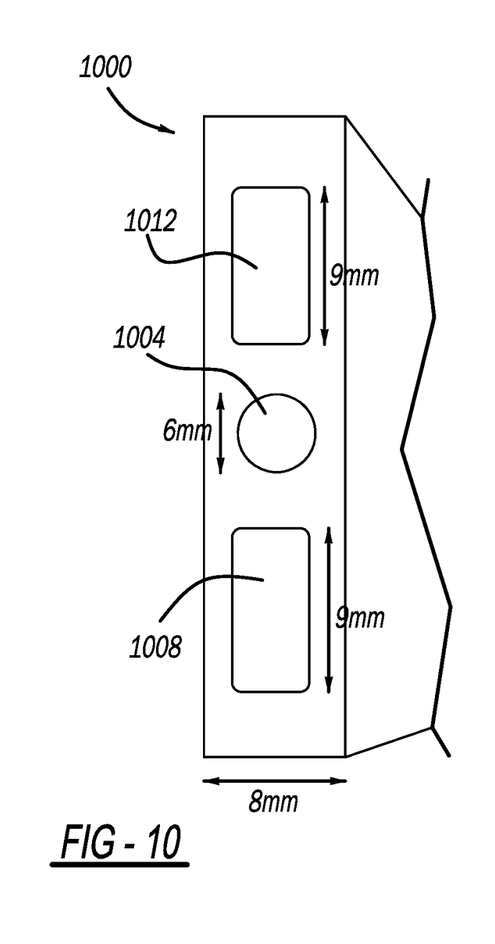
FIG. 10 is a diagrammatic view showing an additive manufactured metal sample including closely spaced circular and rectangular holes.

Referring now to FIG. 10, an additive manufactured metal (AMM) sample 1000 including closely spaced circular and rectangular holes is shown. The AMM sample 1000 is a 35 mm×50 mm×8 mm SS 316 sample printed using a standard Binder Jet process. The AMM sample 1000 includes a circular hole 1004, a first rectangular hole 1008, and a second rectangular hole 1012.

An exemplary SRR sensor described above may be used to image defects of various shapes and sizes in the AMM sample 1000. During the additive manufacturing process, the production of some defects are unavoidable, such as surface roughness, fatigue, and porosity. A robust and reliant NDE system is used for inspection of such materials during manufacturing as well as in service conditions. The above-proposed SRR sensors can be utilized for imaging surface holes of AMM samples. The AMM sample 1000 may be scanned with an x and y resolution of 0.25 mm.

In an exemplary imaging scenario, a surface of the AMM sample 1000 may consist of closely spaced circular and rectangular holes, as shown in FIG. 10. The length and width of the first rectangular hole 1008 and the second rectangular hole 1012 are 9 mm×4 mm, while the diameter of the circular hole 1004 is 6 mm. These surface holes serve as calibration defects in order to estimate the accuracy of an SRR sensor, for example, the sensing SRR array 500 of FIG. 5. During the scan, the raw magnitude and phase of the insertion loss is computed at the resonant frequency of the sensor and is plotted in heat maps depicted in FIGS. 11 and 12.

Figure 11:
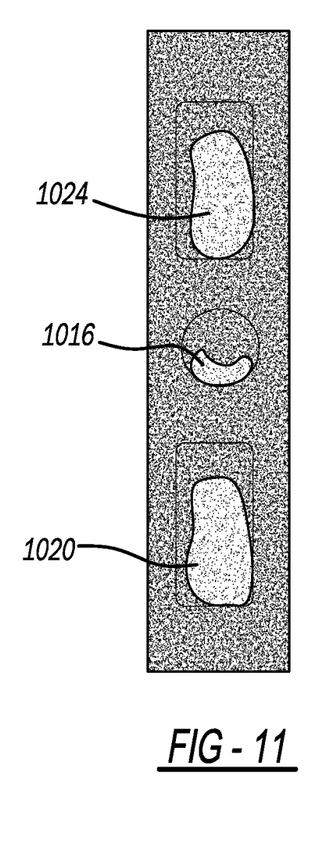
FIG. 11 is a graphical depiction showing a heat-map of a magnitude of an insertion loss at a resonant frequency.
Figure 12:
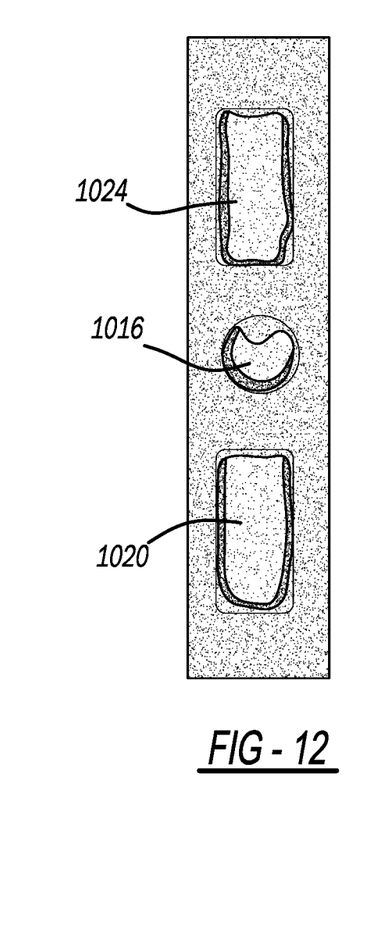
FIG. 12 is a graphical depiction showing a heat-map of a phase of an insertion loss at a resonant frequency.

FIG. 11 is a graphical depiction of a heat-map of a magnitude of an insertion loss at a resonant frequency, and FIG. 12 is a graphical depiction of a heat-map of a phase of an insertion loss at a resonant frequency. Since the resonant frequency shifts to the right in the presence of the metal, an increase of the magnitude and phase of the insertion loss occurs. Therefore, in FIG. 11, the circular hole 1004, the first rectangular hole 1008, and the second rectangular hole are indicated by a partial circle 1016, a first partial rectangle 1020, and a second partial rectangle 1024, respectively, depicted by a color or pattern associated with a shifted magnitude of the insertion loss. Similarly, in FIG. 12, the circular hole 1004, the first rectangular hole 1008, and the second rectangular hole 1012 are indicated by the partial circle 1016, the first partial rectangle 1020, and the second partial rectangle 1024, respectively, depicted by a color or pattern associated with a shifted phase of the insertion loss. Both magnitude and phase values of SRR sensors are capable of imaging all the three holes with high precision and accuracy.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLU- ETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

While various embodiments have been disclosed, it should be appreciated that additional variations of the SRR sensor design are also envisioned. For example, additional or different hardware components may be used although certain of the present advantages may not be fully realized. While certain SRR shapes have been disclosed it should be appreciated that alternate shapes may be used, although all of the present advantages may not be fully achieved. It is also noteworthy that any of the preceding features may be interchanged and intermixed with any of the others. Accordingly, any and/or all of the dependent claims may depend from all of their preceding claims and may be combined together in any combination. Variations are not to be regarded as a departure from the present disclosure, and all such modifications are entitled to be included within the scope and sprit of the present invention.

What is claimed is:

1. A defect sensing apparatus comprising:
   a microstrip transmission line along a length of the defect sensing apparatus;
   a reference split-ring resonator coupled to the microstrip transmission line, the reference split-ring resonator being located on a reference side of the microstrip transmission line;
   a first sensing split-ring resonator coupled to the microstrip transmission line, the first sensing split-ring resonator being located on a sensing side of the microstrip transmission line; and
   a second sensing split-ring resonator coupled to the microstrip transmission line, the second sensing split-ring resonator being located on the sensing side of the microstrip transmission line, wherein the microstrip transmission line is configured to excite the reference split-ring resonator, the first sensing split-ring resonator, and the second sensing split-ring resonator,
   wherein the first sensing split-ring resonator and the second sensing split-ring resonator are configured to scan a sample.

2. The defect sensing apparatus of claim 1 wherein the sensing side of the microstrip transmission line is opposite from the reference side of the microstrip transmission line.

3. The defect sensing apparatus of claim 1 wherein the reference split-ring resonator, the first sensing split-ring resonator, and the second sensing split-ring resonator include an inner ring and an outer ring.

4. The defect sensing apparatus of claim 3 wherein the outer ring of the first sensing split-ring resonator and the second sensing split-ring resonator includes an extended tip.

5. The defect sensing apparatus of claim 4 wherein the extended tip is extended in a direction opposite from the microstrip transmission line.

6. The defect sensing apparatus of claim 3 wherein:
   the inner ring includes a first gap directed toward the microstrip transmission line, and
   the outer ring includes a second gap directed opposite the first gap.

7. The defect sensing apparatus of claim 1 further comprising a third sensing split-ring resonator coupled to the microstrip transmission line and located on the sensing side of the microstrip transmission line.

8. The defect sensing apparatus of claim 1 wherein the first sensing split-ring resonator resonates at a first frequency and the second sensing split-ring resonator resonates at a second frequency, and wherein the first frequency is different from the second frequency.

9. The defect sensing apparatus of claim 1 further comprising:
   at least one processor and a memory in data communication with the defect sensing apparatus, wherein:
      the memory stores instructions for execution by the at least one processor and
      the instructions include:
         measuring a first frequency of the first sensing split-ring resonator;
         storing the first frequency as a first resonant frequency;
         for a predetermined period, measuring a subsequent first frequency of the first sensing split-ring resonator; and
         in response to the subsequent first frequency shifting by a predetermined threshold from the first resonant frequency within the predetermined period, generating an alert.

10. The defect sensing apparatus of claim 9 wherein the instructions include:
    measuring a second frequency of the second sensing split-ring resonator;
    storing the second frequency as a second resonant frequency;
    for the predetermined period, measuring a subsequent frequency of the second sensing split-ring resonator; and
    in response to the subsequent second first frequency shifting by the predetermined threshold from the second resonant frequency within the predetermined period, generating the alert.

11. The defect sensing apparatus of claim 9 wherein the instructions include:
    measuring a reference frequency of the reference split-ring resonator;
    storing the reference frequency; and
    in response to the first frequency shifting by the predetermined threshold from the reference frequency within the predetermined period, generating the alert.

12. A defect sensing system comprising:
    a first sensing split-ring resonator, a second sensing split-ring resonator, and a reference sensing split-ring resonator mounted on a board, the board including a microstrip transmission line separating the reference sensing split-ring resonator;

at least one processor; and a memory, wherein the memory stores a measured frequency database and instructions for execution by the at least one processor, the instructions include:

measuring (i) a first frequency of the first sensing split-ring resonator and (ii) a second frequency of the second sensing split-ring resonator;

storing, in the measured frequency database, the first frequency and the second frequency;

repeating measuring (i) the first frequency and (ii) the second frequency;

comparing the measured first frequency to the stored first frequency;

comparing the measured second frequency to the stored second frequency; and in response to the comparison indicating a first frequency shift or a second frequency shift by a predetermined threshold, generating and transmitting an alert.

13. The defect sensing system of claim 12 further comprising:

a display interface, wherein the instructions include:

repeating the measuring for a predetermined period;

plotting the measured first frequency and the measured second frequency on a frequency graph; and displaying the frequency graph on the display interface.

14. The defect sensing system of claim 12 wherein the instructions include:

measuring a reference frequency of the reference sensing split-ring resonator, wherein the measured first frequency is compared to the measured reference frequency and, in response to the comparison indicating the first frequency shift by a first reference predetermined threshold, generating a reference alert.

15. The defect sensing system of claim 12 wherein the instructions include:

measuring a reference frequency of the reference sensing split-ring resonator, wherein the measured second frequency is compared to the measured reference frequency and, in response to the comparison indicating the second frequency shift by a second reference predetermined threshold, generating a reference alert.

16. The defect sensing system of claim 12 wherein the reference sensing split-ring resonator, the first sensing split-ring resonator, and the second sensing split-ring resonator include an inner ring and an outer ring.

17. The defect sensing system of claim 16 wherein the outer ring of the first sensing split-ring resonator and the second sensing split-ring resonator includes an extended tip.

18. The defect sensing system of claim 17 wherein the extended tip is extended in a direction opposite from the microstrip transmission line.

19. The defect sensing system of claim 16 wherein:

the inner ring includes a first gap directed toward the microstrip transmission line, and the outer ring includes a second gap directed opposite the first gap.

20. A defect sensing apparatus comprising:

a microstrip transmission line along a length of the defect sensing apparatus, wherein the microstrip transmission line includes a first port and a second port, the second port being located on an opposite end from the first port;

a reference split-ring resonator coupled to the microstrip transmission line;

a first sensing split-ring resonator coupled to the microstrip transmission line;

a second sensing split-ring resonator coupled to the microstrip transmission line, wherein the microstrip transmission line is configured to excite the reference split-ring resonator, the first sensing split-ring resonator, and the second sensing split-ring resonator;

at least one processor; and a memory in data communication with the microstrip transmission line, via the first port and the second port, and the at least one processor, wherein the memory stores instructions for execution by the at least one processor and the instructions include:

measuring (i) a first frequency of the first sensing split-ring resonator and (ii) a second frequency of the first sensing split-ring resonator;

storing the first frequency and the second frequency;

repeating measuring (i) the first frequency and (ii) the second frequency;

comparing the measured first frequency to the stored first frequency;

comparing the measured second frequency to the stored second frequency; and in response to the comparison indicating a first frequency shift or a second frequency shift, generating and transmitting an alert.

* * * * *